US008583662B2

(12) United States Patent
Callanan et al.

(10) Patent No.: US 8,583,662 B2
(45) Date of Patent: *Nov. 12, 2013

(54) MANAGING DATA ACROSS A PLURALITY OF DATA STORAGE DEVICES BASED UPON COLLABORATION RELEVANCE

(75) Inventors: Sean Callanan, Dublin (IE); Patrick J. O'Sullivan, Dublin (IE); Hema Srikanth, Cary, NC (US); Carol S. Zimmet, Boxborough, MA (US)

(73) Assignee: Citrix Systems, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,359

(22) Filed: Mar. 12, 2012

(65) Prior Publication Data
US 2012/0173834 A1 Jul. 5, 2012

Related U.S. Application Data

(63) Continuation of application No. 12/346,027, filed on Dec. 30, 2008, now Pat. No. 8,195,617.

(51) Int. Cl.
*G06F 17/30* (2006.01)
(52) U.S. Cl.
USPC ............ 707/749; 707/748; 707/668; 711/165
(58) Field of Classification Search
USPC ........................... 707/748, 668, 749; 711/165
See application file for complete search history.

(56) References Cited

U.S. PATENT DOCUMENTS

| | | | |
|---|---|---|---|
| 5,758,337 A | 5/1998 | Hammond | |
| 5,812,773 A | 9/1998 | Norin | |
| 7,125,490 B2 * | 10/2006 | Clendenning et al. | 210/493.4 |
| 7,702,730 B2 | 4/2010 | Spataro et al. | |
| 7,779,014 B2 * | 8/2010 | York et al. | 707/748 |
| 8,086,605 B2 * | 12/2011 | Xu et al. | 707/732 |
| 2002/0038296 A1 * | 3/2002 | Margolus et al. | 707/1 |
| 2005/0198087 A1 | 9/2005 | Bremers | |
| 2006/0031266 A1 | 2/2006 | Colbeck et al. | |
| 2006/0080371 A1 | 4/2006 | Wong et al. | |

(Continued)

FOREIGN PATENT DOCUMENTS

JP 20020222108 9/2002

OTHER PUBLICATIONS

Lu, et al., "Partial Replica Selection Based on Relevance for Information Retrieval," In Proc. of 22th Annual Int'l ACM SIGIR Conf. on Research and Development in Information Retrieval (1999), 9 pgs.

(Continued)

*Primary Examiner* — Debbie Le
(74) *Attorney, Agent, or Firm* — Banner & Witcoff, Ltd.

(57) ABSTRACT

A computer-implemented method of managing data storage according to collaborative activity can include determining collaborative activity for each of a plurality of data items associated with a first user and stored within a first data storage device. The method can include calculating a measure of relevancy for each of the plurality of data items according to the collaborative activity and comparing the measure of relevancy of each of the plurality of data items to at least one relevancy threshold. Different ones of the plurality of data items can be selectively migrated from the first data storage device to a second data storage device according to the comparison of the measure of relevancy of each of the plurality of data items.

17 Claims, 3 Drawing Sheets

(56) References Cited

U.S. PATENT DOCUMENTS

| | | |
|---|---|---|
| 2006/0089925 A1 | 4/2006 | Kumar |
| 2007/0011155 A1* | 1/2007 | Sarkar ............................. 707/5 |
| 2007/0203775 A1 | 8/2007 | Busch et al. |
| 2007/0220029 A1* | 9/2007 | Jones et al. ................... 707/101 |
| 2007/0255763 A1 | 11/2007 | Beyerle et al. |
| 2007/0255807 A1 | 11/2007 | Hayashi et al. |
| 2008/0028164 A1 | 1/2008 | Ikemoto et al. |
| 2008/0059718 A1 | 3/2008 | Tajima et al. |
| 2008/0134053 A1 | 6/2008 | Fischer |
| 2009/0265430 A1 | 10/2009 | Bechtel et al. |

OTHER PUBLICATIONS

Lu, et al., "Partial Collection Replication versus Caching for Information Retrieval Systems," In ACM Int'l. Conf. on Research and Development in Information Retrieval (2000), 8 pgs.

Lu, "Scalable Distributed Architectures for Information Retrieval," Doctor of Philosophy Dissertation of Zhihong Lu, University of Massachusetts Amherst, May 1999, 194 pgs.

* cited by examiner

MANAGING DATA ACROSS A PLURALITY OF DATA STORAGE DEVICES BASED UPON COLLABORATION RELEVANCE

CROSS-REFERENCE TO RELATED APPLICATIONS

This application is a Continuation of U.S. Pat. No. 8,195,617, issued Jun. 5, 2012, entitled "Managing data across a plurality of data storage devices based upon collaboration relevance," which was filed on Dec. 30, 2008.

BACKGROUND

The embodiments of the present invention relate to managing data storage within a computing environment based upon collaborative activities. Data management can refer to processes such as replication and archival of data. Replication generally refers to the act of selecting a file located within a data storage device and creating a copy of that file within one or more other data storage devices. Replication allows files considered to be important to be copied to alternate data storage devices. When replicating a data set, e.g., a plurality of files, often only a subset of the plurality of files, considered to be of greater importance, is replicated. The copied subset of files can be referred to as a "partial replica."

Archival refers to the process of selecting a file that is located within a data storage device and creating a copy of the file within another data storage device. Once copied, the file can be removed from the original data storage device. Files that are archived are only available from the data storage devices to which those files are archived. Unlike replication, archived files are no longer accessible from the original data storage device. Typically, the archival data storage device is less accessible to users. That is, users must follow more involved procedures to retrieve desired data. An archival data storage device is not as accessible as a local data storage device that is intended for everyday use by a user.

Within conventional systems, the decision to archive data is largely driven by the age of the files. For example, files that are "older" than a specified age may be selected for archival. Replication also may select files according to age, but replicate only newer files, for example. In effect, conventional data management systems make an assumption that the age of a given file is determinative of the importance or relevance of that file to a particular user.

BRIEF SUMMARY OF THE INVENTION

The embodiments disclosed herein relate to managing data storage within a computing environment based upon collaborative activities. One embodiment of the present invention can include a computer-implemented method of managing data storage among a plurality of data storage devices according to collaborative activity. The method can include determining collaborative activity for each of a plurality of data items associated with a first user and stored within a first data storage device. The method further can include calculating a measure of relevancy for each of the plurality of data items according to the collaborative activity and comparing the measure of relevancy of each of the plurality of data items to at least one relevancy threshold. Different ones of the plurality of data items can be selectively migrated from the first data storage device to a second data storage device according to the comparison of the measure of relevancy of each of the plurality of data items.

Another embodiment of the present invention can include a system for managing data. The system can include a memory storing computer-usable program code that, when executed, selectively manages data storage among a plurality of data storage devices and a processor executing the computer-usable program code. The processor can determine collaborative activity for each of a plurality of data items associated with a first user stored within a first data storage device. The processor further can calculate a measure of relevancy for each of the plurality of data items according to the collaborative activity and compare the measure of relevancy of each of the plurality of data items to at least one relevancy threshold. The processor can selectively migrate different ones of the plurality of data items from the first data storage device to a second data storage device according to the comparison of the measure of relevancy of each of the plurality of data items.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
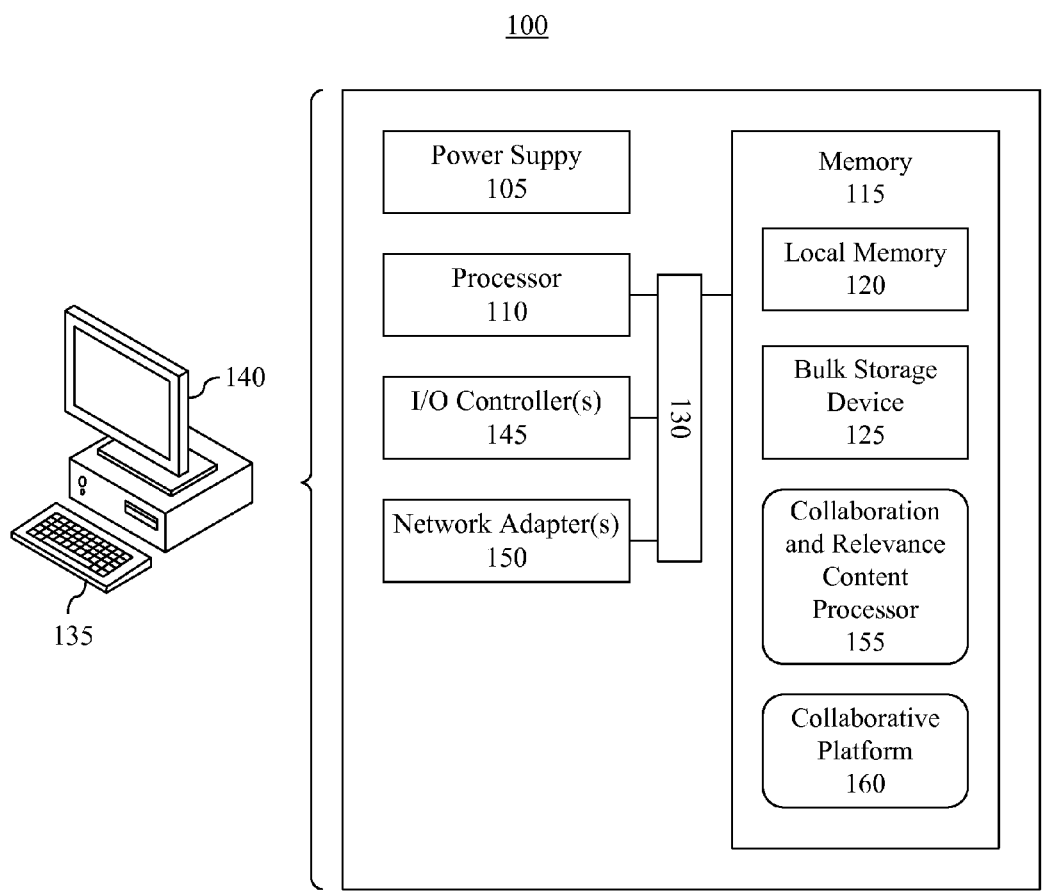
FIG. 1 is a block diagram illustrating a system for managing data among a plurality of data storage devices based upon collaboration data in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein relate to managing data among a plurality of data storage devices based upon collaboration data. More particularly, the embodiments disclosed within this specification relate to replication and archival of data based upon collaboration relevance. In accordance with the inventive arrangements disclosed herein, data can be archived and/or replicated based upon a measure of relevancy of the content with respect to a particular user.

The measure of relevancy for each data item managed as described can be calculated based upon collaborative activity that relates to that particular data item and the user that is considered the owner of the data item. The value calculated for the measure of relevancy can indicate the processing to be performed upon that data item, e.g., the particular data storage device from which the data item will be migrated or to which the particular data item will be migrated, as the case may be. In this manner, data items can be selectively archived or replicated based upon the likelihood of a user needing that data item, as reflected in the measure of relevancy derived from collaborative activities of the user, as opposed to the age of the data item.

FIG. 1 is a block diagram illustrating a system 100 for managing data among a plurality of data storage devices based upon collaboration data in accordance with one embodiment of the present invention. System 100 can be implemented as a data processing system, e.g., a computer, that can execute computer-usable program code. Accordingly, system 100 can include a power supply 105 providing power to the various components of system 100. System 100 further can include at least one processor 110 coupled directly or indirectly to memory elements denoted as memory 115 through a system bus 130. Memory 115 can include one or more physical memory devices or elements. The elements can include, for example, local memory 120 employed during actual execution of the program code, e.g., random access memory (RAM), one or more bulk storage devices 125, e.g., a "hard disk drive" or other persistent data storage device, and cache memories (not shown) which provide temporary storage of at least some program code in order to reduce the number of times code must be retrieved from bulk storage during execution.

Input/output (I/O) devices such as a keyboard 135, a display 140, and a pointing device (not shown) optionally can be coupled to system 100 as well as one or more other I/O devices. The I/O devices can be coupled to system 100 either directly or through one or more intervening I/O controllers 145. One or more network adapters 150 also can be coupled to system 100 through system bus 130 to enable system 100 to become coupled to other data processing systems or remote printers or storage devices through intervening private or public networks. Modems, cable modems, and Ethernet cards are just a few of the currently available types of network adapters 150.

As shown, memory 115 can store a collaboration and relevance content processor (CRCP) 155 application, which can be executed by processor 110 to perform the various functions described within this specification. In general, processor 110, executing the CRCP 155, can determine collaborative activity for each of a plurality of data items that are part of a collaborative platform 160, which also can be stored in memory and executed by processor 105, or another computer. In this regard, each data item is associated with a user, e.g., the user of system 100, and stored within a data storage device, e.g., bulk storage device 125 and/or local memory 120. The user of system 100 can be considered the "owner" of the data items being managed.

The phrase "data item," as used herein, can refer to any of a variety of programmatic objects that can be stored in memory of a computer. For example, a data item can refer to a file such as an electronic mail, an instant message, or the like. A data item also can refer to a word processing document, a markup language document, and/or another type of electronic document. In still another example, a data item can refer to an entry or record of a table or database, e.g., a particular entry that corresponds to a electronic mail in the inbox of a user. In this sense, a data item can refer to a portion of a file, e.g., an entry of a table or database file. In some cases, a data item can refer to an entry of a table or database as well as the particular file that is referenced by that entry.

In one embodiment, collaborative platform 160 can be an electronic mail client that selectively replicates and/or archives data, e.g., electronic mails, stored within the electronic mail client. In another embodiment, collaborative platform 160 can be an instant messaging (IM) client that persists instant messages and IM conversations and which also archives and/or replicates data stored by the IM client. Other examples of collaborative platforms 160 and data items can include teamspaces, activities, document libraries, Blogs, Wikis, social bookmarking systems, calendar invitations, and the like. Virtually each of the systems described can be used as a collaborative platform in coordination with the CRCP 155 to manage archival and/or replication of data items within such a system.

In any case, processor 110 can calculate a measure of relevancy for each of the plurality of data items maintained within the collaborative platform 160 according to the collaborative activity associated with each respective data item. Processor 110 can compare the measure of relevancy of each of the plurality of data items to at least one relevancy threshold and, based upon that comparison, selectively migrate different ones of the plurality of data items from the bulk storage device 125 to an auxiliary data storage device.

Within this specification, the term "migration," "migrating," and/or "migrate" will be used to refer collectively to both an archival process and a replication process. Migrating a data item in terms of archiving, can refer to copying a data item that is located within a local data storage device to an auxiliary data storage device used for archiving. The data item that is archived can be removed or purged from the original location, e.g., the local data storage device. Migrating also can refer to copying a data item from an auxiliary data storage device to a local data storage device.

In the context of replication, migrating a data item can refer to copying a data item from a local data storage device to an auxiliary data storage device used for replication. Migrating a data item also can refer to the process of removing or purging a data item from the auxiliary data storage device for replication when the system determines that replication of the data item is no longer necessary.

System 100 represents an embodiment of a system that can be implemented within a user's system. In that case, CRCP 155 can be implemented as client-side software. In another embodiment, however, system 100 can represent a system that can be implemented as a server. In that case, CRCP 155 can be implemented as server side software, that executes in conjunction with server-side collaboration software. System 100 also can be implemented as a combination of client side software and server side software.

Accordingly, though FIG. 1 characterized the movement of data items as occurring from the local data storage device, e.g., bulk storage device 125, to an auxiliary data storage device that is suited for archival, replication, or both, it should be appreciated that the measure of relevancy also can be used to migrate data items from the auxiliary data storage device. In either case, the measure of relevancy can be calculated as new collaborative information comes available, from time-to-time, or periodically, e.g., dynamically over time. As such, the measure of relevancy can dynamically change over time for any given data item. The measure of relevancy may increase or decrease over time with respect to the collaborative activity that is observed.

The manner in which the measure of relevancy for each data item can change can be independent of the age of that data item. In this regard, the measure of relevancy differs from conventional systems where data is archived based upon the age of the data. In such systems, data is archived, replicated, or removed from a replication data storage device based upon age of the data item. In terms of archiving, the data is not brought back to the user's local computer without an explicit request to do so. By comparison, the changing collaborations of a user may cause the relevancy of a particular data item that has been archived to increase such that system 100 automatically brings the archived data item back to bulk storage device 125 from an auxiliary data storage device.

Figure 2:
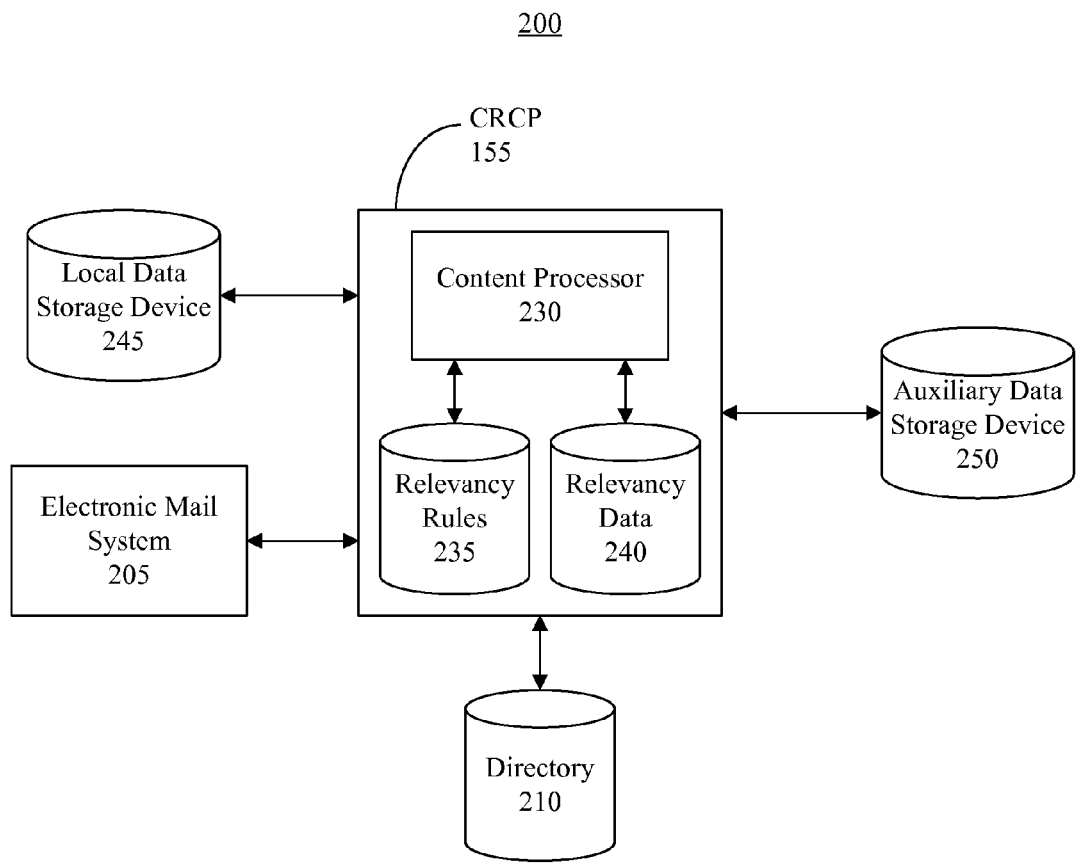
FIG. 2 is a block diagram illustrating a system for managing data among a plurality of data storage devices based upon collaboration data in accordance with another embodiment of the present invention.

FIG. 2 is a second block diagram illustrating a system 200 for managing data among a plurality of data storage devices based upon collaboration data in accordance with another embodiment of the present invention. As shown, system 200 can include CRCP 155 executing within a host computer as described. CRCP 155 can operate in conjunction with a collaborative system. In the example illustrated in FIG. 2, the collaborative system is an electronic mail system 205 and the data items that are managed are entries in the electronic mail system 205 corresponding to electronic mails and the electronic mails themselves. As noted, however, the embodiments described herein can be applied to other types of collaborative systems and data items. As such, electronic mails are used solely provide a better understanding of various aspects of the embodiments described herein.

In one embodiment, CRCP 155 can execute within the computer of a user. In that case, electronic mail system 205 can be a client electronic mail application that belongs to the user of the computer. In another embodiment, CRCP 155 can execute within a server. In that case, electronic mail system 205 can represent the portion of a server-side mail system that corresponds to the user. In either case, the user will be the owner of the electronic mails in the sense that the user is either a recipient or a sender of each electronic mail being managed.

System 200 can include a local data storage device 245 and an auxiliary data storage device 250. The local data storage device 245 can reside within a computer of the user. The local data storage device 245 can be used for purposes of daily, regular computing. Thus, when a user accesses an electronic mail from his or her electronic mail client, that electronic mail will be stored within local data storage device 245. Auxiliary data storage device 250 can be a remote data storage device with respect to the computer of the user, e.g., not within the computer of the user. In general, auxiliary data storage device 250 can be used for purposes of archival and/or replication and can be a managed resource within a networked computing environment.

Thus, local data storage device 245 and auxiliary data storage device 250 can be coupled via a communication network (not shown). The communication network can be implemented as, or include, without limitation, a WAN, a LAN, the Public Switched Telephone Network (PSTN), the Web, the Internet, and one or more intranets. The communication network further can be implemented as or include one or more wireless networks, whether short or long range, including mobile communication networks.

Accordingly, auxiliary data storage device 250 is not easily accessible by the user. That is, to access an electronic mail from auxiliary data storage device 250, the user must first locate any desired electronic mail. The user then can initiate an action to retrieve that electronic mail from auxiliary data storage device 250 and copy such electronic mail to local data storage device 245. Without such explicit action, the electronic mail within auxiliary data storage device 250 would not be accessible within the electronic mail system 205 of the user.

CRCP 155 can include a content processor 230, one or more relevancy rules 235, and relevancy data 240. Relevancy rules 235 can specify how a measure of relevancy is calculated for each of a plurality of electronic mails stored as part of electronic mail system 205 within local data storage device 245. The relevancy rules 235 can vary according to file type, if desired, or can be applied unilaterally regardless of file type. For example, the particular relevancy rules applied to word processing documents can be different from those applied to spreadsheets, which also can be different from those applied to electronic mails, and/or instant messages for that matter. In general, the relevancy rules 235 will specify a formula, for example, that can be used to determine a measure of relevancy for each electronic mail.

Content processor 230 can obtain collaborative data relating to the electronic mails, process the collaborative data according to the relevancy rules 235, and output a measure of relevancy for each electronic mail. As used herein, "output" or "outputting" can include, but is not limited to, storing data in memory, e.g., writing to a file, writing to a user display or other output device, e.g., playing audible notifications, sending or transmitting to another system, exporting, or the like. Content processor 230 can store the measures of relevancy for each respective electronic mail within the relevancy data 240.

Relevancy rules 235 can specify different formulas that can take into account collaborative data that can be obtained relating to the electronic mails. The collaborative data can be obtained from the electronic mail system 205 and/or from one or more other systems coupled to CRCP 155, such as directory 210. The collaborative data that can be utilized as parameters of relevancy rules 235 can include, for example, the number of times an electronic mail is accessed by the user, the last time the electronic mail was accessed by the user, the sender of the electronic mail, any other recipients of the electronic mail, keyword matches of content within any of the fields of the electronic mail, e.g., the body or the subject line, and the priority of the electronic mail. "Accessing" an electronic mail, as used within this specification, can refer to opening the electronic mail or viewing the content, e.g., body, of the electronic mail. The collaborative data that is evaluated can correspond to the data items being evaluated and also can relate to, or involve, the user. Additional collaborative data that can be used as parameters of relevancy rules 235 can include tagging data from a tagging collaborative system. For example, tagging data can include electronic mails that have been tagged with a particular frequency or that have been recently tagged with a particular value.

The directory 210 can be coupled to the CRCP 155 via the communication network so that the CRCP 155 can retrieve additional collaborative information relating to users identified as being the sender and/or a recipient of an electronic mail within electronic mail system 205. Using directory 210, additional collaborative information can be obtained that can be employed when calculating a measure of relevancy for an electronic mail. Such information can include, for example, the role of a user associated with an electronic mail within an organization and/or the organizational distance between two or more users associated with a particular electronic mail. Directory 210 also can specify information such as which users are on a given team of an organization, which users are working on a particular project, etc.

Directory 210 is provided for purposes of illustration and is not intended as a limitation of the embodiments disclosed herein. For example, information found within directory 210 as well as additional information that may be incorporated into the relevancy rules 235 can be obtained from other sources such as a social networking Web site, a team work space, e.g., Web site, or another type of computing environment in which relationships among users are stored and can be queried.

In accordance with the embodiments described within this specification, the CRCP 155 can, for example, identify particular electronic mails that are associated with a selected project. The identification can be through keyword searching for terms or phrases found within different electronic mails that correspond to a stored description of a project or task or that correspond to keywords specifically defined for the project or task. The identification also can be performed through identifying particular users that are associated with the electronic mail, e.g., senders or recipients, and determining that such users are on a same team as the owner of the electronic mail system 205, or are on a same project as the owner of electronic mail system 205.

The relevancy rules 235 can utilize any combination and/or weighting of the different parameters existing within the electronic mail system 205, directory 210, or another collaborative system as described in determining a measure of relevancy for each electronic mail. The resulting measures of relevancy, as calculated by the content processor 230, can be stored within relevancy data 240 on a per electronic mail basis.

Content processor 230 can calculate measures of relevancy for the plurality of electronic mails in a dynamic manner throughout the day. For example, content processor 230 can calculate measures of relevancy periodically, upon request, from time to time, or responsive to detecting particular events. In illustration, content processor 230 can poll different collaborative systems to obtain or update collaborative data, e.g., project lists, users associated with projects, and calculate the measures of relevancy responsive to updating the collaborative data. In another example, content processor 230 can update measures of relevancy responsive to a user input, or upon receiving a further electronic message.

In one embodiment, relevancy rules 235 can be implemented as a corporate policy. For example, a corporate policy can be implemented that spans the user population. In that case, relevancy rules 235, as opposed to being tailored to a particular individual, can be applied across individuals based upon the various types of parameters described. While the corporate policy can be applied across the user population as a whole, such corporate policies also can be broken down into one or more subgroups such that different identifiable user groups, whether defined by geography, teams, projects, corporate longevity, social network, job role, division, etc., can be specified and applied on a group-by-group basis rather than at the individual level or at the global user level. In terms of a group corporate policy, each data item, or electronic mail in this example, that has an association with a selected project can have a special, or increased, measure of relevancy.

In any case, content processor 230 can migrate electronic mail from local data storage device 245 to auxiliary data storage device 250, or vice versa, based upon the measure of relevancy calculated for each respective electronic mail. For example, a first threshold can be established or set. When the measure of relevancy for an electronic mail exceeds the threshold, the electronic mail can be considered relevant to the user of electronic mail system 205.

Accordingly, in terms of an archival process, that electronic mail, when already stored within local data storage device 245, can be maintained, or kept, within local data storage device 245. It should be appreciated that when referring to an electronic mail, or any other data item for that matter, any data associated with that electronic mail can be maintained, copied, or migrated, as the case may be, in the same manner as the electronic mail, e.g., as part of the electronic mail. For example, the entry corresponding to the electronic mail that may be viewed within an inbox view of the user's electronic mail client and the electronic mail itself, e.g., the file referenced by the entry, can be maintained within local data storage device 245. If the electronic mail is located in an auxiliary data storage device, the electronic mail can be moved or copied to the local data storage device 245, causing the electronic mail, and any associated data, to be accessible or appear within the electronic mail client of the user. The user can view the entry corresponding to the electronic mail within his or her inbox for example. The electronic mail itself can be moved or copied to local data storage device 245.

When the measure of relevancy of the electronic mail falls below the threshold, the electronic mail, if stored within local data storage device 245, can be archived to auxiliary data storage device 250. If already stored within auxiliary data storage device 250, the electronic mail can be maintained within auxiliary data storage device 250 until such time that the measure of relevancy of the electronic mail exceeds the threshold.

Within a replication process, when the measure of relevancy of an electronic mail exceeds a threshold, that electronic mail can be replicated from local data storage device 245 of the user to auxiliary data storage device 250. When the measure of relevancy of the electronic mail falls below the threshold, the copy of the electronic mail stored within auxiliary data storage device 250 can be deleted as the electronic mail is no longer considered to be relevant.

As noted, whereas conventional systems utilize age of a data item to determine when that data item is to be migrated to another data storage device, the embodiments disclosed herein utilize collaborative activity of a user. Thus, the measures of relevancy for a data item can change over time in a manner that is independent of the age of the data item. For example, the data item that was archived one night may be brought back from archive to the user's local computer system the next night when the collaborative data associated with that data item changes and, when analyzed using relevancy rules 235, results in a higher measure of relevancy that merits recovery from archive. The same can be true of replication.

In addition, relevancy rules 235 can be changed from time to time, or as desired. This adds another dynamic aspect to the management of data. For example, a calculation specified by a relevancy rule can be changed or altered to reflect a change in the importance or weighting of a collaborative parameter. A parameter may be added or removed from the calculation specified by the relevancy rule. Relevancy rules can be added or deleted. In any case, the newly calculated measures of relevancy can be used to determine which data items will be migrated.

Figure 3:
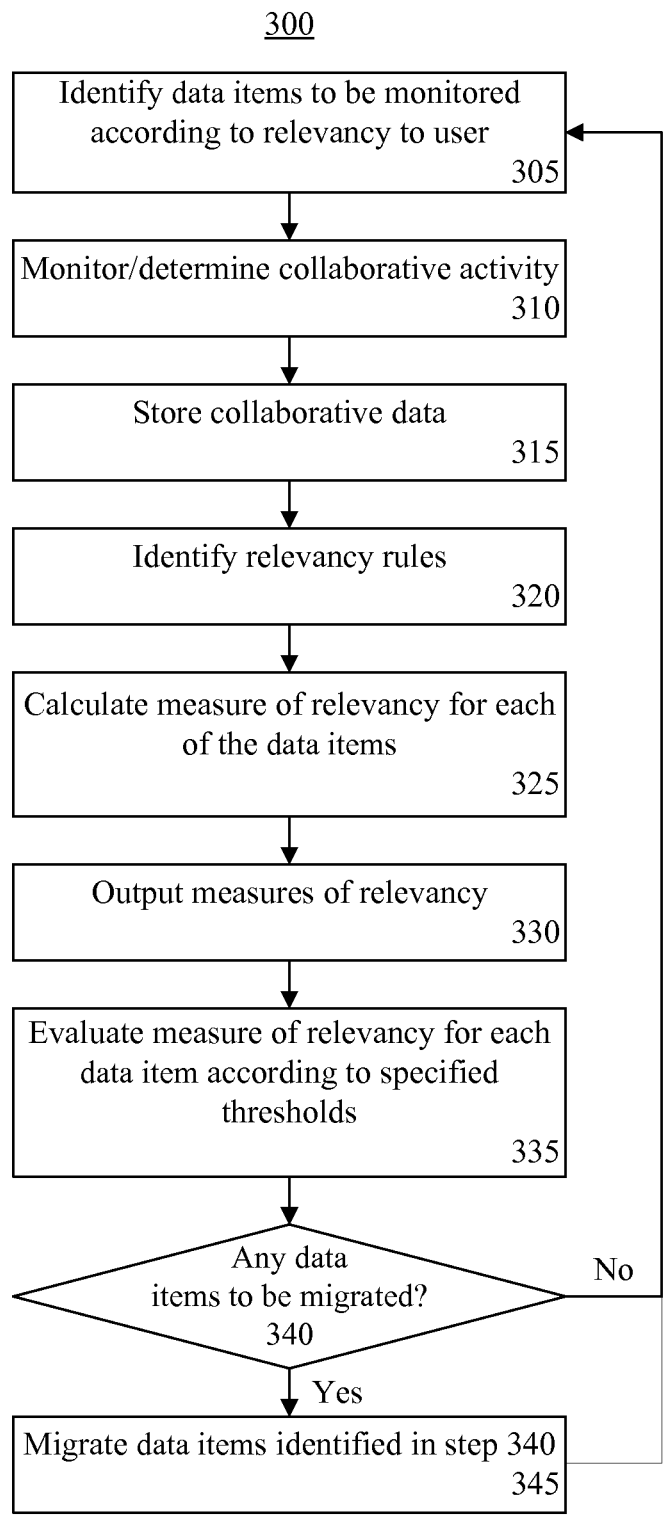
FIG. 3 is a flow chart illustrating a method of managing data among a plurality of data storage devices based upon collaboration data in accordance with another embodiment of the present invention.

FIG. 3 is a flow chart illustrating a method 300 of managing data storage according to collaborative activity in accordance with another embodiment of the present invention. Method 300 can be implemented using a system as described with reference to FIGS. 1 and 2. Method 300 can begin in step 305 where the system can identify a plurality of data items of a user to be monitored according to relevancy. For example, the plurality of data items can be electronic mails within an electronic mail system or other messages. In any case, the data items will belong to one particular user and, as such, the measure of relevancy will reflect the relevancy of each data item to that user.

In step 310, the system can monitor and/or determine collaborative activity relating to the data items identified in step 305. For example, the system can detect actions such as accesses of the data items, the number of times each data item has been accessed, e.g., over a particular time period such as the last month, the last several days, or the like. The users with which each data item is associated, the project with which each data item may be associated, etc., can be monitored and/or retrieved from any other systems, e.g., directories, social networking systems, etc., that may be coupled to the system. In step 315, the system can store collaborative data derived or obtained from the collaborative activities that are monitored.

In step 320, the system can identify the relevancy rules that are applicable to the identified data items and for the user. As noted, the particular relevancy rules that are used can vary according to the type(s) of data items being evaluated for relevancy. The relevancy rules also can vary for each user. For example, consider the case where an electronic mail is sent to user A and to user B. Application of the relevancy rules for user A can result in a measure of relevancy for the electronic message with respect to user A. Application of the relevancy rules for user B can result in a different and higher measure of relevancy for the same electronic message with respect to user B.

The difference can be that, for example, user B is involved in a project with which the electronic mail is associated, whereas user A is not directly involved. For example, a different weighting can be determined based upon a project management database that associates user B with the project to which the electronic mail belongs. In another example, user B may have a particular role within the project that results in the assignment of a higher measure of relevancy to the electronic mail than is merited according to the role user A has been assigned for the project. In another example, user A may have been carbon copied on the electronic mail while user B was a recipient of the electronic mail as specified in the "to" field. That difference also can result in a different measure of relevancy being applied to the electronic mail for each user. Further, as noted, relevancy rules can be implemented as a corporate policy across all users or for selected groups of users.

In step 325, the system can calculate a measure of relevancy for each of the data items identified in step 305. As noted, the calculation of relevancy, though shown as a single step, can be continually performed, performed periodically, from time to time, or responsive to particular events. In any case, the measures of relevancy may change over time in a manner that depends upon the collaborative data collected as opposed to the age of the data items being managed.

In step 330, the system can output the measures of relevancy for each of the data items. In step 335, the system can evaluate the measures of relevancy for each data item with respect to one or more thresholds. If, for example, a data item has a measure of relevancy that exceeds a threshold, that data item can be migrated from a current data storage device to a different data storage device. If the data item is already located in the determined target data storage device, the data item can be maintained in its current location.

It should be appreciated that multiple thresholds can be established that will result in different actions being taken.

For example, multiple thresholds can be established with each range between the thresholds being associated with a particular data storage device. A data item having a measure of relevancy that exceeds a first threshold, but not a second higher threshold, can be migrated to a first data storage device. A data item having a measure of relevancy that exceeds the second threshold, but not a third higher threshold, can be migrated to a second data storage device.

In another embodiment, the thresholds applied for migration from a local data storage device to an auxiliary data storage device can vary from those used when migrating from the auxiliary data storage device back to a local data storage device. Different thresholds also can be used when determining whether to purge a data item from an auxiliary data storage device, e.g., no longer replicate a particular data item, as compared to those used for archiving or determining when to initially replicate a data item.

In step 340, the system can determine whether any data items are to be migrated. If so, method can continue to step 345. In step 345, the system can migrate any data items identified in step 340 from the auxiliary data storage device or devices and/or migrate any data items identified in step 340 to the auxiliary data storage devices, e.g., from the local data storage device. It should be appreciated that the embodiments disclosed herein also can be used to determine when to migrate data from one auxiliary data storage device to another data storage device. For example, when the measure of relevancy of a data item falls below a threshold, that data item can be moved to a first auxiliary data storage device. When the measure of relevancy falls below yet a second lower threshold, that data item can be migrated yet again to a different auxiliary data storage device intended for longer term storage, for example.

In another embodiment, particular restrictions can be implemented that decrease the dynamic nature of the embodiments described. More particularly, selected decisions, whether archival or replication of a data item, can be made permanent such that a changing measure of relevancy for the data item does not change the decision that was made. For example, a rule can be specified that makes archival decisions permanent. In that case, once a data item is archived, that data item will remain archived despite any change in the measure of relevancy of the data item to the user. The user may, however, issue an explicit request to recover the data item from archive.

In still another aspect, changing measures of relevancy for data items can be used to determine when a data item is permanently removed from a system, e.g., moved to the trash or deleted. Whether moved from a local data storage device or another data storage device for replication and/or archival, when the measure of relevancy falls below an established threshold, that data item can be deleted. This technique can be used to determine when to purge data items from archive, from replication, or when to purge data items from the local data storage device for the user. For example, the measure of relevancy for a data item can fall below a first threshold causing the data item to be archived. When the measure of relevancy of the data time falls below a second threshold that is lower than the first threshold, the data item can be deleted from the archive. The user can be given the option of whether to accept such a deletion. For example, the data items to be purged can be moved to a trash or other non-permanent storage area where the user may be required to first approve of the deletion of the dat item before the deletion becomes permanent, though this need not be the case.

The embodiments described within this specification provide methods, systems, and apparatus for managing data among a plurality of different data storage devices. Rather than relying upon the age of a data item as the sole means of determining the relevance of a data item to a particular user, collaborative data relating to the data item can be used. In this manner, a dynamic approach to relevancy can be implemented where the relevancy of a data item becomes a user-centric process that can increase or decrease over time. Data items may be archived, retrieved from archived, replicated, or removed from replication in a dynamic and automated way based upon the measure of relevancy calculated for each respective data item.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of managing data storage among a plurality of data storage devices according to collaborative activity, the method comprising:

determining collaborative activity for each of a plurality of data items associated with a first user and stored within a first data storage device;
calculating a measure of relevancy for each of the plurality of data items according to the collaborative activity;
comparing the measure of relevancy of each of the plurality of data items to at least one relevancy threshold; and
selectively migrating different ones of the plurality of data items from the first data storage device to a second data storage device according to the comparing the measure of relevancy of each of the plurality of data items.

2. The computer-implemented method of claim 1, wherein the collaborative activity is determined using a most recent access by the first user of each of the plurality of data items.

3. The computer-implemented method of claim 1, wherein the collaborative activity is determined using a number of times each of the plurality of data items has been accessed by the first user.

4. The computer-implemented method of claim 1, wherein the second data storage device comprises a plurality of auxiliary data storage devices, and the method further comprising, for a selected data item:
determining that the selected data item is to be copied from the first data storage device to the second data storage device;
selecting one of the plurality of auxiliary data storage devices according to the measure of relevancy of the selected data item; and
migrating the selected data item to the selected one of the plurality of auxiliary data storage devices.

5. The computer-implemented method of claim 1, further comprising: selecting a data item from the plurality of data items;
determining a relationship between the first user and a second user associated with the selected data item; and
calculating the measure of relevancy for the selected data item according to the relationship between the first user and the second user.

6. The computer-implemented method of claim 1, further comprising: selecting a data item from the plurality of data items;
determining that the selected data item is associated with a project, wherein the first user has a defined role in the project; and
calculating the measure of relevancy for the selected data item according to the project and the role of the first user in the project.

7. A system for managing data, the system comprising:
a memory storing computer-usable program code that, when executed, selectively manages data storage among a plurality of data storage devices; and
a processor executing the computer-usable program code, wherein the processor:
determines collaborative activity for each of a plurality of data items associated with a first user and stored within a first data storage device;
calculates a measure of relevancy for each of the plurality of data items according to the collaborative activity;
compares the measure of relevancy of each of the plurality of data items to at least one relevancy threshold; and
selectively migrates different ones of the plurality of data items from the first data storage device to a second data storage device according to the comparison of the measure of relevancy of each of the plurality of data items.

8. The system of claim 7, wherein
the processor further determines a most recent access of each of the plurality of data items by the first user as a collaborative activity.

9. The system of claim 7, wherein
the processor determines a number of times each of the plurality of data items has been accessed by the first user as a collaborative activity.

10. The system of claim 7, wherein
the second data storage device comprises a plurality of auxiliary data storage devices, and
the processor, for a selected data item:
determines that the selected data item is to be copied from the first data storage device to the second data storage device;
selects one of the plurality of auxiliary data storage devices according to the measure of relevancy of the selected data item; and
migrates the selected data item to the selected one of the plurality of auxiliary data storage devices.

11. The system of claim 7, wherein
the processor further:
selects a data item from the plurality of data items;
determines a relationship between the first user and a second user associated with the selected data item; and
calculates the measure of relevancy for the selected data item according to the relationship between the first user and the second user.

12. The system of claim 7, wherein
the processor further:
selects a data item from the plurality of data items;
determines that the selected data item is associated with a project, wherein the first user has a defined role in the project; and
calculates the measure of relevancy for the selected data item according to the project and the role of the first user in the project.

13. A non-transitory computer program product comprising a computer-usable storage medium having stored therein computer-usable program code for managing data storage among a plurality of data storage devices according to collaborative activity, computer-usable program code, which when executed by a computer hardware system, causes the computer hardware system to perform
determining collaborative activity for each of a plurality of data items associated with a first user and stored within a first data storage device;
calculating a measure of relevancy for each of the plurality of data items according to the collaborative activity;
comparing the measure of relevancy of each of the plurality of data items to at least one relevancy threshold; and
selectively migrating different ones of the plurality of data items from the first data storage device to a second data storage device according to the comparing the measure of relevancy of each of the plurality of data items.

14. The computer program product of claim 13, wherein
the collaborative activity is determined using at least one of a most recent access of each of the plurality of data items or a number of times each of the plurality of data items has been accessed by the first user.

15. The computer program product of claim 13, wherein
the second data storage device comprises a plurality of auxiliary data storage devices, and
the computer-usable program code further causes the hardware system to perform, for a selected data item:

determining that the selected data item is to be copied from the first data storage device to the second data storage device;

selecting one of the plurality of auxiliary data storage devices according to the measure of relevancy of the selected data item; and migrating the selected data item to the selected one of the plurality of auxiliary data storage devices.

16. The computer program product of claim 13, wherein the computer-usable program code further causes the hardware system to perform:

selecting a data item from the plurality of data items;

determining a relationship between the first user and a second user associated with the selected data item; and calculating the measure of relevancy for the selected data item according to the relationship between the first user and the second user.

17. The computer program product of claim 13, wherein the computer-usable program code further causes the hardware system to perform:

selecting a data item from the plurality of data items;

determining that the selected data item is associated with a project, wherein the first user has a defined role in the project; and calculating the measure of relevancy for the selected data item according to the project and the role of the first user in the project.

* * * * *